United States Patent [19] [11] 3,819,980
Mullersman [45] June 25, 1974

[54] EMERGENCY LIGHTING SYSTEM
[75] Inventor: Ferdinand H. Mullersman, Gainesville, Fla.
[73] Assignee: General Motors Company, Owensboro, Ky.
[22] Filed: Mar. 16, 1972
[21] Appl. No.: 235,371

[52] U.S. Cl. .................... 315/86, 307/66, 315/130, 315/135, 315/165, 315/171
[51] Int. Cl. ........................................... H05b 41/14
[58] Field of Search ....... 315/86, 87, 129, 130, 135, 315/136, 160, 161, 165, 171, 173; 307/66

[56] References Cited
UNITED STATES PATENTS
3,002,105  9/1961  Cady .................................. 307/66 X
3,189,788  6/1965  Cady .................................. 307/66 X
3,599,070  8/1971  Davis et al. ...................... 315/86 X
3,631,257  12/1971 Behr et al. ............................ 307/66
FOREIGN PATENTS OR APPLICATIONS
1,438,339  12/1968  Germany .............................. 307/66

Primary Examiner—Herman Karl Saalbach
Assistant Examiner—James B. Mullins
Attorney, Agent, or Firm—N. J. Cornfeld; D. A. Dearing; F. L. Neuhauser

[57] ABSTRACT

An emergency lighting system is provided for rapidly switching a battery into a load circuit in the event AC power on a main line is lost. A first rectifier normally supplied a first charging voltage from the AC power to the battery and a second rectifier supplies a second voltage to a monitoring circuit which keeps the battery switched out of the load circuit until the AC power is lost. In one embodiment where the load is a lamp or lamps the load is normally operating at below rated AC voltage of the lamp for longer life. When the AC power fails, the battery provides sufficient power to the lamp or lamps to provide approximately the same light output. In another embodiment the load is intermittently supplied with battery voltage upon AC power failure to prolong the battery life and to attract attention to the power failure.

9 Claims, 5 Drawing Figures

EMERGENCY LIGHTING SYSTEM

BACKGROUND OF THE INVENTION

This invention relates to emergency lighting systems and more particularly to emergency lighting systems using rechargeable batteries.

With today's modern office buildings and apartment houses containing colossal labyrinthine hallways and stairwells interconnecting a multitude of windowless rooms, the need for reliable lighting is greater than ever before. With today's increasing demands on existing overburdened electrical power plants and power distribution systems, the likelihood of having power failures and resulting blackouts is greater than ever before. Hence, a need exists for a reliable and economic emergency lighting device which can provide sufficient auxiliary lighting in the event of a general power failure.

To be reliable, the emergency lighting device must: maintain a continuous charge on an auxiliary power supply; contain an illuminative load which is not worn out by normal everyday usage; and remain able to switch on automatically upon the event of a power failure. To be economical, the emergency lighting device should comprise a minimum of electrical components consonant with high reliability and performance and obtain the maximum performance from each component so that a large number of emergency lighting devices can be manufactured and maintained for a minimum cost per unit. Ideally, the emergency lighting device should also be readily adaptable for use with existing lighting facilities such as existing exit and hall lighting fixtures.

SUMMARY OF THE INVENTION

It is therefore an object of the present invention to provide a new, economical, and reliable means for providing emergency lighting in the event of a power failure.

A further object of the present invention is to provide an emergency lighting device which is readily adaptable to existing lighting fixtures.

Another object of the present invention is to provide an emergency lighting device which delivers reduced voltage to lamp means during normal operation to increase lamp life.

Yet another object of the invention is to provide an emergency lighting system in which a rechargeable battery powers a lamp under emergency conditions at about rated voltage to provide more efficient use of battery power.

Still another object of the present invention is to provide an emergency lighting device which provides a flashing light in the event of a power failure.

Further objects and advantages of the present invention will be apparent to those skilled in the art from the following description taken in conjunction with the attached drawings.

To accomplish the above objects, one embodiment of the present invention comprises a first rectifier which supplies a first source of rectified power from an AC source. This power is supplied to a battery to maintain a desired charge thereon. The battery is also connected to a first load, preferably a lamp, through an emitter-collector path of a first transistor. A second rectifier is connected to the AC source to supply a second source of rectified power. The second rectified voltage is applied to a monitoring circuit comprising the parallel combination of a resistor and a capacitor. A resulting charge on the capacitor during normal AC operation is communicated to the base of the first transistor to hold the first transistor in a nonconductive state. When AC power is lost, the capacitor discharges through the resistor. The decrease in charge on the capacitor allows the first transistor to switch to a conductive state thereby providing a conductive path from the battery to the first load.

In another embodiment half-wave rectification is used to supply less than rated voltage to one or more lamps under normal operating conditions to prolong lamp life. The half-wave peaks are used to supply battery charging voltage. When only one lamp is used the battery voltage is preselected to provide approximately the same light output. When two lamps are used the battery may be used to illuminate one of the lamps in the emergency mode at about rated voltage to provide about the same light output as both lamps operating under normal conditions on half-wave power. In this latter way not only is long lamp life achieved but more efficient use is made of battery power during the emergency mode.

A further embodiment of the present invention includes an astable multivibrator connected between the monitoring circuit and the first transistor. The multivibrator is held off during normal AC operation by the charge on the capacitor. When AC power is lost the capacitor discharges and the astable multivibrator acts to periodically turn the first transistor on and off to cause the load to flash.

BRIEF DESCRIPTION OF THE DRAWINGS

For a fuller understanding of the invention reference is made to the detailed description below when taken with the drawings wherein.

DESCRIPTION OF THE PREFERRED EMBODIMENTS

Figure 1:
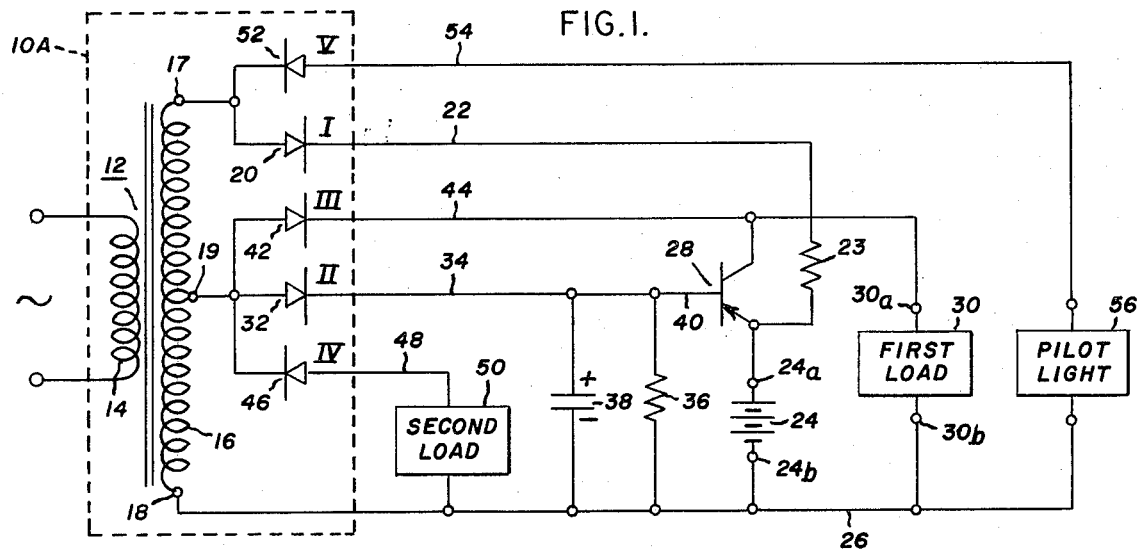
FIGS. 1, 2, 3, and 4 are circuit diagrams showing various embodiments of the present invention.

FIG. 1 is a circuit diagram of one embodiment of the present invention. FIG. 1 shows a power supply 10a which includes a transformer 12 having a primary winding 14 energized from an AC power source (not shown). Transformer 12 has a secondary winding 16 which secondary winding has first and second ends 17 and 18 and a tap 19. End 17 is connected to a first (I) diode means 20 to supply a first rectified voltage from the AC power source. This first voltage is communicated by a line 22 and a load resistor 23 to a first terminal 24a of a battery 24. If desired a lamp of proper electrical characteristics can be paralleled with resistor 23 to indicate charge current flow to battery 24. Line 26 is a common line connected between a second terminal 24b of battery 24 and the second end 18 of secondary winding 16. Hence, battery 24 is continuously charged to a preselected value by the first rectified voltage supplied on line 22 during normal AC operation. It should be noted that charge control means can be included in line 22 to control the charging of the battery if desired.

A PNP transistor 28 having an emitter, collector and base is shown with the emitter connected to terminal 24a of battery 24 and the collector connected to a first terminal 30a of a first load 30. A second terminal 30b of first load 30 is connected to the common line 26. First load 30 is typically a lamp having a voltage rating commensurate with the voltage potential of battery 24.

Tap 19 of secondary winding 16 is connected to a second (II) diode means 32 to supply a rectified voltage on line 34 from the AC power source. Line 34 is connected to a first end of a parallel combination of resistor 36 and capacitor 38 and also to the base of transistor 28 by conductor 40. The other ends respectively of resistor 36 and capacitor 38 are connected to common line 26. As is well known to those skilled in the art a diode may be inserted in line 40 to protect the base-emitter of transistor 28 from reverse voltage breakdown.

In addition to the above mentioned components, the embodiment of the present invention shown in FIG. 1 also comprises a third (III) diode means 42 connected to tap 19 of secondary winding 16. Diode 42 supplies rectified voltage to first load 30 by line 44 during normal AC operation.

A fourth (IV) diode means 46 connected to tap 19 supplies rectified voltage by line 48 to a second load 50 which second load 50 may be a lamp similar to that used as first load 30. Second load 50 is also connected to common line 26 to provide a return current path.

Also shown in FIG. 1 is a fifth (V) diode means 52 connected to end 17 of secondary winding 16. Diode 52 supplies rectified voltage from the AC power source by line 54 to a pilot light 56 used to indicate that voltage is available at the transformer secondary 16 to charge battery 24. Pilot light 56 is also connected to common line 26 to provide a return current path to the secondary winding 16. During normal application of AC power the primary winding 14 of transformer 12 is supplied with an alternating current signal. The signal is induced across secondary winding 16. During the half cycles that first end 17 of secondary winding 16 is positive with respect to end 18, hereinafter termed "the positive half cycles," there is a first rectified voltage from diode 20 delivered through resistor 23 to battery 24 thereby maintaining battery 24 at a preselected charge. Also during "said positive half cycles," there is a second rectified voltage from diode 32 which is delivered to capacitor 38 such that capacitor 38 is charged with a polarity indicated in FIG. 1. Resistor 36 provides a long discharge time constant so that capacitor 38 maintains a charge during AC operation sufficient to continuously reverse bias the base emitter junction of transistor 28 thus rendering the transistor nonconductive.

In the event of an AC power failure, capacitor 38 discharges through resistor 36 permitting battery 24 to drive current through the base emitter junction of transistor 28 and resistor 36 thus switching transistor 28 on to complete a DC circuit between battery 24 and first load 30. Thus the RC network by controlling the bias of transistor 28 may be considered a sensing means for sending an electrical signal to transistor 28 to denote power being supplied from the AC source. It should be noted that when AC power fails diode 42 in line 44 provides means for isolating the battery 24 from the power supply 10a, thereby allowing substantially all of the battery power to be supplied to first load 30.

In the above description of operation diode 42 and line 44 may be omitted and then the first load 30 is not energized during normal AC operation. In some embodiments this is desirable in order to preserve the first load 30 for use only during emergency operations. However, under some circumstances it is desirable to operate first load 30 during normal AC operation.

In FIG. 1, the third diode or rectifier means represented by diode 42 provides a third voltage via line 44 to energize first load 30 during normal AC operation. The third rectifier represented by diode 42 may be either a full wave rectifier or may be a half wave rectifier as illustrated in FIG. 1 to provide the third voltage only during the positive half cycles. This rectifier is necessary to prevent charging of capacitor 38 by battery 24 during loss of AC power.

Also shown in FIG. 1 is a second load 50 which is energized by a fourth diode means 46. Diode means 46 preferably provides half wave rectification to provide power to load 50 on alternate half cycles to the power supplied to load 30. This provides a balanced load on the transformer. Alternatively load 50 could be powered directly without rectification from an appropriate tap on secondary 16. In the practical case, lamp load 30 would be chosen to provide the proper illumination at rated voltage, and battery 24 would be chosen to match this rated lamp voltage and provide adequate run time. Transformer tap 17 would be chosen to provide adequate voltage to permit charging the battery. Tap 19 would be chosen to provide an RMS rectified voltage (half or full wave) to lamp loads 30 and 50 sufficiently less than rated voltage lamp voltage to permit long lamp life yet sufficient to provide a total light output equal to the illumination from one lamp at rated voltage. Typically to permit a balanced load for the transformer on alternate half cycles, loads 30 and 50, when operated half wave, as illustrated, are made equal and the light output from each lamp load when incandescent can be made to provide about 50 percent of the required total illumination, as well as greatly extended life, by operating them at about 80–85 percent of rated voltage.

Also shown in FIG. 1 is a fifth rectifier represented by diode 52 which provides a rectified voltage over line 54 to a pilot lamp 56 which can be used as a derangement signal as is well known to those skilled in the art. The polarity of diode 20 and diode 52 therefore provides a rectified voltage on alternate half cycles to respectively charge battery 24 on the positive half cycles and illuminate pilot lamp 56 on the negative half cycles. By powering the charging and derangement circuits alternately, no significant change in charge current occurs if the pilot lamp should burn out.

A third diode or rectifier means illustrated by diode 42, the second load 50, and the pilot lamp 56 all operate independent of one another—apart from balancing the transformer load and therefore all or any combination of them may be removed from the emergency lighting device. For example, in FIG. 2 another embodiment of the present invention is shown in which second load 50 and pilot lamp 56 are not used.

Figure 2:
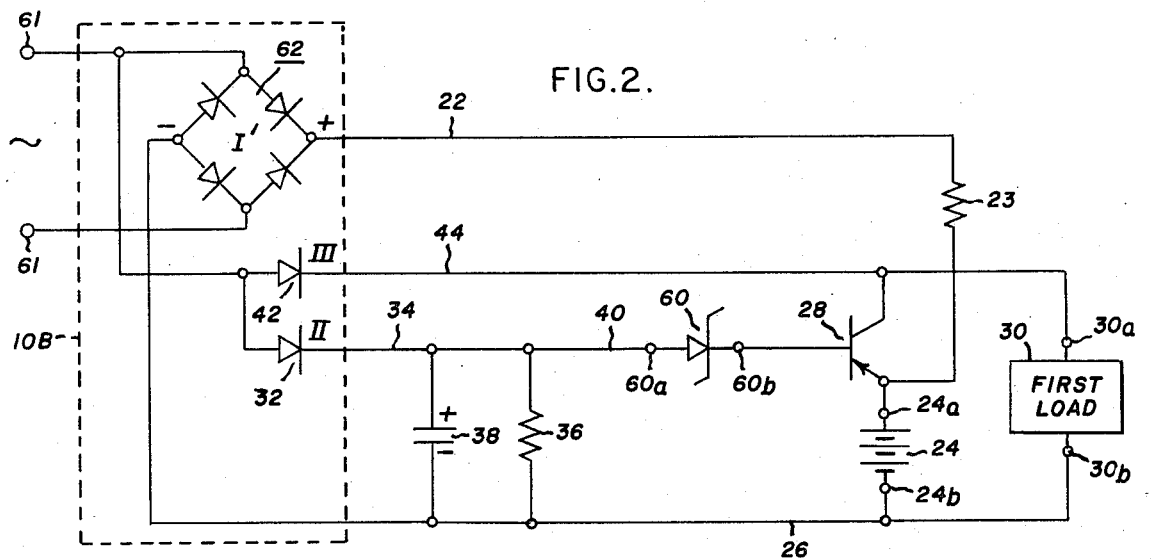

The embodiment of the present invention shown in FIG. 2 is also different from the embodiment in FIG. 1 in that a different power supply 10B has been substituted for power supply 10A and a zener diode 60 is connected in conductor 40. Zener diode 60 has an anode 60a connected to the first end of the combination comprising resistor 36 and capacitor 38 and a cathode 60b connected to the base of transistor 28. Battery 24 and first load 30 remain connected in the same manner as shown in FIG. 1.

Power supply 10B does not employ a transformer as does power supply 10A, but rather obtains power from the AC source through AC terminals 61 directly to a full wave rectifier bridge 62. Rectifier 62 thereby acts as a means for supplying a rectified voltage to line 22 analogous to the first voltage of FIG. 1. The second and third rectifier means 32 and 42 are connected directly to one of the AC terminals 61 instead of tap 19 as shown in FIG. 1. However, both second and third rectifiers act as described above with respect to FIG. 1 to provide second and third voltage to lines 34 and 44 respectively.

The operation of the embodiment shown in FIG. 2 is substantially the same as described above: the full-wave voltage on line 22 is used to charge battery 24, the voltage on line 34 is used to charge capacitor 38 and thereby hold transistor 28 nonconductive during normal AC operations, and the voltage supplied on line 44 is used to energize first load 30 during normal AC operations. When the AC power fails, capacitor 38 once again discharges through resistor 36 permitting the battery to provide base current via zener 60 and resistor 36 switching transistor 28 to a conductive state and thereby energizing first load 30 with the potential from battery 24.

Zener diode 60 functions as a control means during emergency operation to provide a limit or control on the discharge of battery 24. This limit is determined by the voltage drop across zener diode 60 and transistor 28 base-emitter junction which causes the base current of transistor 28 to cease when the battery voltage has fallen to that level. When the output potential of battery 24 drops below the value necessary to sustain base current in transistor 28, transistor 28 will switch to a nonconductive state and battery 24 will once again be disconnected from first load 30 in this way protecting battery 24 from damage which may be associated with over discharge.

Figure 3:
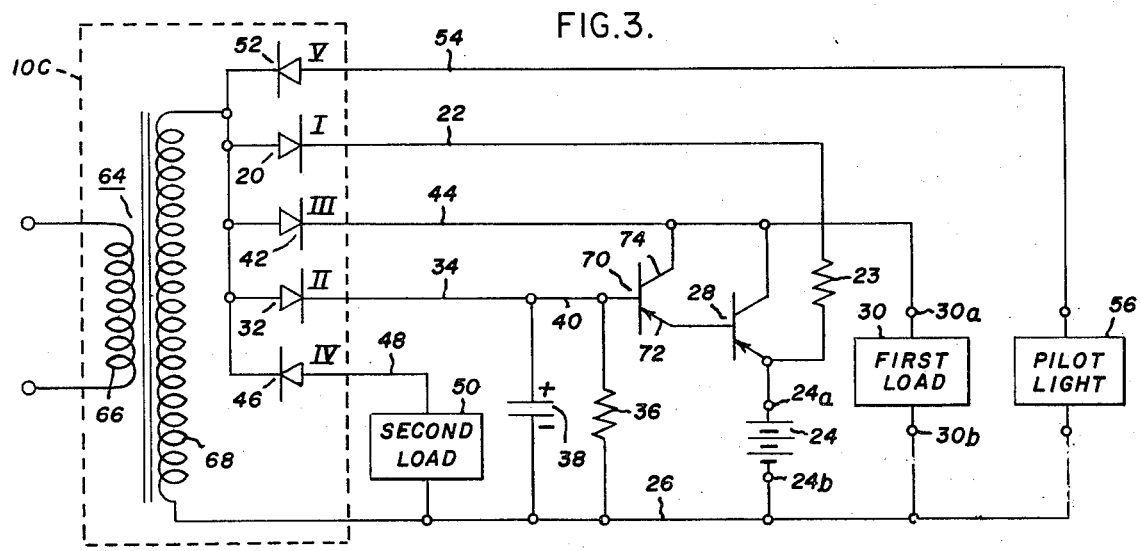
Figure 4:
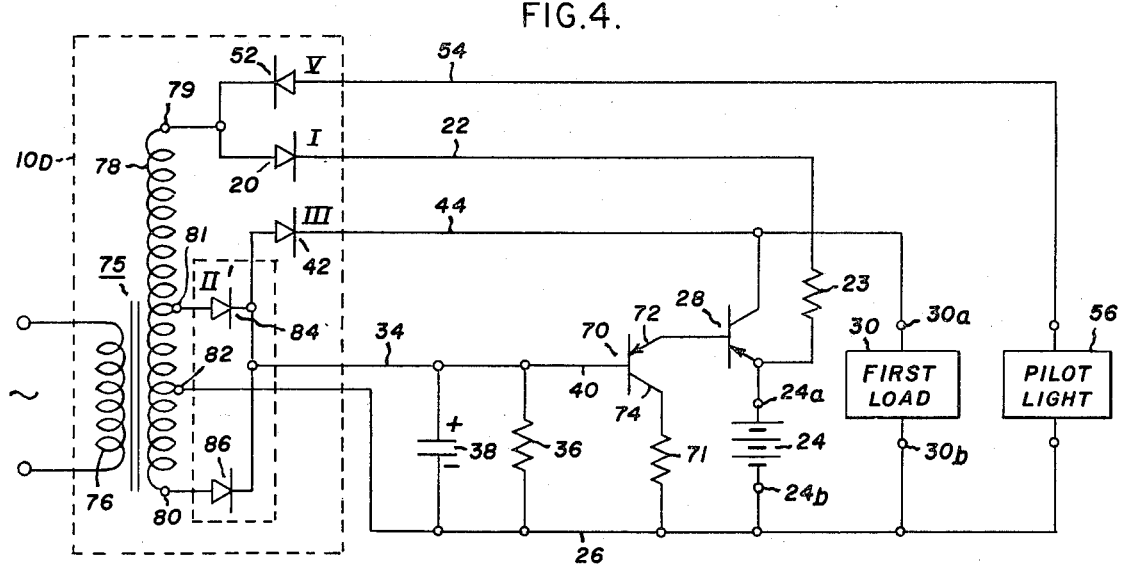

Thus it will be apparent to those skilled in the electronics art that power supplies 10A and 10B may be interchanged. For example, if a light fixture already in use has a transformer as illustrated by transformer 12 in FIG. 1, and it is desired to use the circuit of FIG. 2 because one wishes to place a lower limit on the voltage to which battery 24 discharged by the means including zener diode 60 shown in FIG. 2, then the circuit of FIG. 2 may be used with the power supply 10A of FIG. 1. Two additional power supplies 10C and 10D are shown in FIGS. 3 and 4 respectively. It is to be understood that one skilled in the art may use any of the power supplies 10A, 10B, 10C, or 10D in any of the disclosed embodiments of the present invention by proper selection of component values.

In FIG. 3 power supply 10C is shown to comprise a transformer 64 having a primary winding 66 and a secondary winding 68. Primary winding 64 is connected to an AC power source (not shown) and a resultant signal is induced in secondary winding 68. One end of a secondary winding 68 is connected to: a first diode or rectifier means represented by diode 20 to supply a first rectified voltage, a second diode or rectifier represented by diode 32 generates a second rectified voltage on line 34, a third rectifier represented by diode 42 generates the third voltage over line 44, a fourth diode or rectifier means represented by diode 46 generates the fourth voltage over line 48, and a fifth rectifier represented by diode 52 for supplying the fifth voltage over line 54.

As in FIGS. 1 and 2, the first voltage through diode 20 is used to charge battery 24 during normal AC operation, the second voltage is used to charge capacitor 38, the third voltage is used to energize first load 30 during normal AC operation, the fourth voltage is used to energize second load 50, and the fifth voltage is used to energize pilot light 56 to indicate that voltage is available to charge battery 24.

In addition to the components shown in FIGS. 1 and 2, the embodiment shown in FIG. 3 comprises a second PNP transistor 70 having an emitter 72 connected to the base of transistor 28, a base connected to conductor 40, and a collector 74 connected to line 44. The charge on capacitor 38 is used to bias transistor 70 into a nonconductive state during normal AC operation. When transistor 70 is nonconductive, no base current can flow from transistor 28 and therefore transistor 37 is also held in a nonconductive state. When AC power is lost and the charge on capacitor 38 begins to discharge through resistor 36, transistors 70 and 28 are turned to a conductive state allowing the potential from battery 24 to be communicated to first load 30.

The advantage of using first and second transistors 28 and 70 instead of using a single transistor 28 as shown in FIGS. 1 and 2, is that transistor 70 can be chosen to have sensitive switching characteristics whereas transistor 28 can be chosen to a power transistor to handle a large current from battery 24. The embodiment of the present invention disclosed in FIG. 4 also shows the embodiment of first transistor 28 and second transistor 70. In FIG. 4, howver, collector 74 of second transistor 70 is connected through a resistor 71 to common line 26. Upon conduction of transistor 70 in FIG. 3, the collector current from transistor 70 is applied to first load 30 whereas the collector current from transistor 70 in FIG. 4 is transmitted through resistor 71 to common line 26.

While the embodiment of the present invention shown in FIG. 4 can be powered by either power supplies 10A, 10B, or 10C, a power supply 10D is disclosed. Power supply 10D comprises a transformer 75 having a primary winding 76 and a secondary winding 78. Secondary winding 78 has a first end 79, a second end 80, a first tap 81 and a second tap 82. First end 79 is connected to a first diode or rectifier means represented by diode 20 which acts to supply the first voltage to line 22. A second rectifier circuit comprises a diode 84 connected to a first tap 81 and a diode 86 connected to second end 80 of secondary winding 78. The cathode ends of both diodes 84 and 86 are connected together for supplying the second rectified voltage over line 34 during normal AC operation. A third diode or rectifier means represented by diode 42 is connected to line 34 for supplying the third voltage to line 44. In FIG. 4, no second load 50 is employed and therefore no fourth rectifier circuit is used. However, a fifth diode or rectifier means represented by diode 52 is connected to the first end 79 of secondary winding 78 to supply voltage over line 54 to pilot light 56. Common line 26 is shown connected to second tap 82 to provide a return path for the rectified voltages.

The operation of the embodiment shown in FIG. 4 is the same as the operation described above with respect to FIG. 3. In either embodiment a zener diode may be connected in series with the base of transistor 70 in the same manner that zener diode 60 is shown connected to the base of transistor 28 in FIG. 2. The zener diode would then act the same as zener diode 60 to limit discharge of battery 24 during emergency operations.

Figure 5:
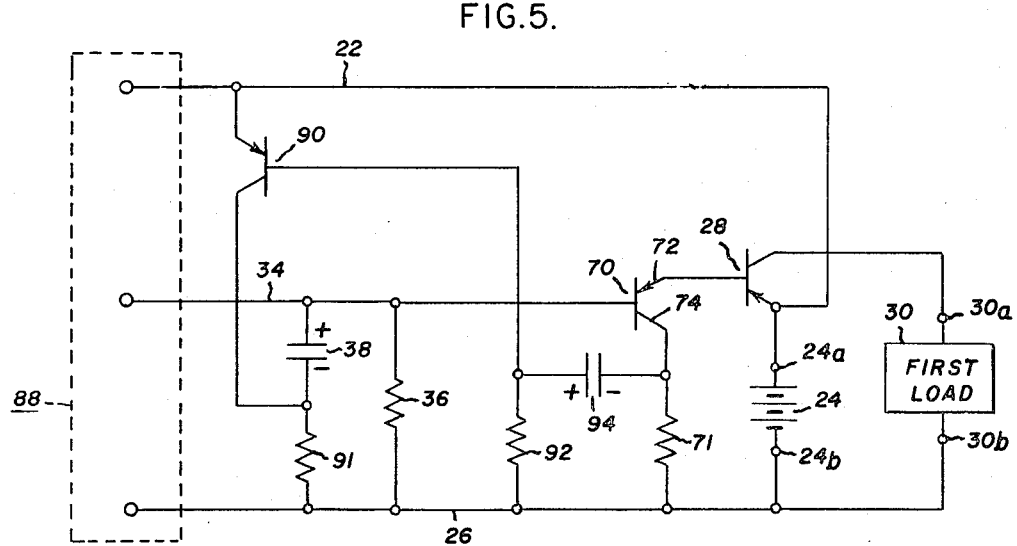
FIG. 5 is a circuit diagram showing another embodiment of the present invention which includes an astable multivibrator.

The embodiment of the present invention disclosed in FIG. 5 is substantially identical to the embodiment shown in FIG. 4 except for the addition of a means for alternately turning transistor 70 on and off during emergency operations. In particular, transistors 28 and 70, battery 24, first load 30, and resistor 71 are connected in the same manner as the similarly numbered components in FIG. 4. In addition, a power supply designated as power supply 88 is employed to provide a first voltage over line 22, a second voltage over line 34, and a connection for common line 26. Power supply 88 as an example, may be either power supplies 10A, 10B, 10C, or 10D disclosed above or portions thereof.

The first voltage supplied over line 22 is used to charge battery 24 during normal AC operations. The second voltage over line 34 is used to charge capacitor 38 to the polarity shown in FIG. 5 and to a voltage greater the sum of the battery voltage plus the base-emitter voltage drops. A resistor 91 is shown connected between the negative plate of capacitor 38 and common line 26. This resistor 91, however, does not substantially effect the charging procedure of capacitor 38. Capacitor 38 therefore maintains a positive charge on its upper plate during normal AC operation which positive charge is large enough to maintain transistors 70 and 28 in a nonconductive state during normal AC operations.

The means for alternately turning transistor 70 on and off during emergency operation comprises a transistor 90, a resistor 92, and a capacitor 94. The emitter of transistor 92 is connected to line 22 and the collector of transistor 90 is connected to the negative plate of capacitor 38. The base of transistor 90 is connected to one end of capacitor 94 while the other end of capacitor 94 is connected to the collector of transistor 70. Resistor 92 is shown connected between the base of transistor 90 and common line 26.

During normal AC operation, transistor 90 is conductive causing a charge to be placed across capacitor 94 of the polarity shown. When AC power is lost, and the charge in capacitor 38 diminishes to a point that transistor 70 is turned on, the negatively charged plate of capacitor 94 is immediately clamped to essentially the positive potential of battery 24 through the emitter-collector path of transistors 70 and base-emitter of transistor 28. The clamping of capacitor 94 causes transistor 90 to be switched off. While transistors 70 and 28 are switched on, the battery 24 is connected to energize first load 30 through the emitter-collector path of transistor 28.

In addition, while transistor 70 is turned on, capacitor 94 discharges through resistors 92 and 71. As the charge in capacitor 94 begins to dissipate, a point is reached when transistor 90 switches back on. At this time, transistor 70 now becomes biased in a nonconductive state. Transistors 70 and 90 continue to alternate between conductive and nonconductive states as is well known to those familiar with the operation of an electronic astable multivibrator to cause a flashing effect at first load 30.

As soon as AC potential is returned, capacitor 38 attains its former positive charge at its upper plate, keeping transistor 70 continuously biased in a nonconductive state.

It will be understood that various changes may be made in the details within the scope of my claims without departing from the spirit of my invention. For example, the use of either PNP or NPN semiconductors is any of the described embodiments of the present invention (with proper polarity adjustments) should be deemed to be within the spirit of my invention. In addition, any of the power supplies disclosed with a particular embodiment of the present invention may be also used with any of the other embodiments of the present invention. It is therefore understood that my invention is not to be limited to the specific details shown and described.

What I claim as new and desire to secure by Letters Patent of the United States is:

1. An emergency lighting system comprising:
   a. first diode means for supplying a first rectified voltage from an AC source;
   b. second diode means for supplying a second rectified voltage from said AC source;
   c. a common line;
   d. a battery having a first terminal connected to receive said first rectified voltage and having a second terminal connected to said common line;
   e. a first transistor having an emitter, collector and base, said emitter being connected to said first terminal of said battery;
   f. a first load connected between the collector of said transistor and said common line;
   g. a capacitor and a resistor connected at first and second common junctions to form a parallel combination, said first junction connected to receive said second rectified voltage and said second junction connected to said common line;
   h. a second transistor, said first junction of said combination is connected to the base of said second transistor, the base of said first transistor is connected to the emitter of said second transistor, and the collector of said second transistor is in electrical communication with said first load, said second transistor being biased to a nonconductive state when said combination has a voltage thereacross exceeding a predetermined magnitude and to bias said second transistor to a conductive state when said combination has a voltage thereacross less than said predetermined magnitude; and
   i. means for intermittently turning said second transistor on and off after said AC source ceases to provide power above a predetermined magnitude.

2. The system of claim 1 wherein said turning means is an stable multivibrator.

3. An emergency lighting system comprising:
   a. a source of AC power;
   b. a first lamp connected in circuit with said AC source;
   c. a rechargeable battery connected in parallel with said first lamp and said AC source and having a voltage output approximately equal to the rated voltage of said first lamp;
   d. charging means coupling said AC source and said battery to recharge said battery when power is being supplied by said AC source above a predetermined value to said first lamp.

e. sensing means for generating a signal in response to power supplied by said AC source;

f. switching means connected in circuit with said first lamp and said battery, said sensing means being coupled to said switching means, said switching means being operable to open and close said circuit connection between said first lamp and said battery when said power from said AC source is above or below, respectively, said predetermined value responsive to the signal being supplied to said switching means by said sensing means;

g. a second lamp connected in series with said AC source; and h. means to reduce the voltage from said AC source to said first and second lamps below the rated voltage of said lamps sufficiently to reduce the total light output of both lamps to approximate the light output of said first lamp along at its rated voltage to provide long lamp life when power is being supplied from said AC source above said predetermined value and efficient utilization of said battery when power supplied by said AC power source is below said predetermined value.

4. An emergency lighting system comprising:

a. a source of AC power;

b. a transformer having a primary winding connected to said AC source and having a secondary winding;

c. a first load connected in circuit with said secondary winding of said transformer;

d. a rechargeable battery connected in parallel with said load and said secondary winding;

e. charging means coupling said secondary winding and said battery to recharge said battery when said power is being supplied from said AC source above a predetermined value to said load;

f. sensing means for generating a signal in response to power supplied by said AC source;

g. switching means connected in circuit with said load and said battery, said sensing means being coupled to said switching means, said switching means being thereby operable to open and close said connection with said first load and said battery when said power from said AC source is above and below, respectively, said predetermined value responsive to the signal being supplied to said switching means by said sensing means;

h. a first rectification means for half-wave rectification connected to said secondary winding in a first direction to conduct a rectified voltage to said first load during a first series of alternate half cycles of said AC source and not to conduct during a second series of alternate half cycles alternating with said first series of half cycles;

i. a second rectification means for half-wave rectification connected to said secondary winding in a second direction to be blocked during said first series of half cycles when said first rectification means is conductive and to supply a second rectified voltage during said second series of half cycles;

j. a second load connected between said secondary winding and said second rectification means for receiving said second rectified voltage.

5. An emergency lighting system comprising:

a. an AC power source;

b. a transformer having a primary winding connected to said AC source and having a secondary winding;

c. a first load connected in circuit with said secondary winding of said AC source;

d. a first diode means for half-wave rectification connected to secondary winding in a first direction to conduct a first rectified voltage during a first series of alternate half cycles of said AC source and not to conduct during a second series of alternate half cycles alternating with said first series of half cycles;

e. a rechargeable battery coupled to said first diode means to receive said first rectified voltage for charging said battery during said first series of half cycles;

f. sensing means coupled to said secondary winding for generating a signal in response to power being supplied by said AC source;

g. switching means connected in circuit with said first load and said battery, said sensing means being coupled to said switching means, said switching means being operable to open and close said connection with said load and said battery when said power being supplied from said AC source is above and below said predetermined value responsive to the signal being supplied to said switching means by said sensing means;

h. a first rectification means for half-wave rectification coupled to said secondary winding in a first direction to conduct a rectified voltage to said first load during said first series of half cycles of said AC source and not to conduct during said second series of half cycles;

i. a second rectification means for half-wave rectification connected to said secondary winding in a second direction to be blocked during said first series of half cycles of said AC source and to supply a rectified voltage during said second series of half cycles;

j. a second load coupled to said second rectification means for receiving said rectified voltage of said second rectification means;

k. a third rectification means for half-wave rectification coupled to said secondary winding in a second direction to be blocked during one of said first and second series of half cycles of said AC source and to supply a rectified voltage during the other of said first and second series of half cycles; and l. a pilot light coupled to said third rectification means for receiving said rectified voltage of said third rectification means.

6. An emergency lighting system comprising:

a. an AC power source;

b. a transformer having a primary winding connected to said AC source and having a secondary winding with first and second ends and an intermediate tap;

c. a first diode means connected to said first end for generating a first rectified voltage from said AC source;

d. a second diode means connected to said tap for supplying a second rectified voltage from said AC source;

e. a common line connected to said second end;

f. a battery having a first terminal connected to receive said first rectified voltage and having a terminal connected to said common line;
g. a first transistor having an emitter, collector and base, said emitter being connected to said first terminal of said battery;
h. a first load connected between the collector of said transistor and said common line;
i. a capacitor and a resistor connected at first and second common junctions to form a parallel combination, said first common junction connected to receive said second rectified voltage and said second junction connected to said common line;
j. means coupling the first junction of said combination and the base of said first transistor to bias said transistor to a nonconductive state when said combination has a voltage thereacross exceeding a predetermined magnitude and to bias said transistor to a conductive state when said combination has a voltage thereacross less than said predetermined magnitude;
k. a third diode means for half-wave rectification connected to said tap in a first direction to conduct a third rectified voltage to said first load during positive half cycles of said AC source and not to conduct during negative half cycles therebetween, said third rectified voltage being less than said first rectified voltage;
l. a fourth diode means for half-wave rectification connected to said tap in a second direction to be blocked during said positive half cycles of said AC source and to supply a fourth rectified voltage during said negative half cycles therebetween; and
m. a second load connected between said common line in said fourth diode means for receiving said fourth rectified voltage.

7. An emergency lighting system comprising:
a. an AC power source;
b. a transformer having a primary winding connected to said AC source and having a secondary winding with first and second ends and an intermediate tap;
c. a first diode means for half-wave rectification connected to said AC source in a first direction to conduct a first rectified voltage during positive half cycles of said AC source and to not conduct during negative half cycles therebetween;
d. a second diode means connected to said tap for supplying a second rectified voltage from said AC source;
e. a common line connected to said second end;
f. a battery having a first terminal connected to receive said first rectified voltage and having a terminal connected to said common line;
g. a first transistor having an emitter, collector and base, said emitter being connected to said first terminal of said battery;
h. a first load connected between the collector of said transistor and said common line;
i. a capacitor and a resistor connected at first and second common junctions to form a parallel combination, said first junction of said combination connected to receive said second rectified voltage and said second junction connected to said common line;
j. means coupling the first junction of said combination and the base of said first transistor to bias said transistor to a nonconductive state when said combination has a voltage thereacross exceeding a predetermined magnitude and to bias said transistor to a conductive state when said combination has a voltage thereacross less than said predetermined magnitude;
k. a third diode means for half-wave rectification connected to said tap in a first direction to conduct a third rectified voltage to said first load during positive half cycles of said AC source and not to conduct during negative half cycles therebetween, said third rectified voltage being less than said first rectified voltage;
l. a fourth diode means for half-wave rectification connected to said tap in a second direction to be blocked during said positive half cycles of said AC source and to supply a fourth rectified voltage during said negative half cycles therebetween;
m. a second load connected between said common line in said fourth diode means for receiving said fourth rectified voltage;
n. a fifth diode means for half-wave rectification connected to said AC source in a second direction to be blocked during said positive half cycles of said AC source and to supply a fifth rectified voltage during said negative half cycles therebetween; and o. a pilot light connected between said common line and said fifth diode means for receiving said fifth rectified voltage.

8. An emergency lighting system comprising:
a. a source of AC power;
b. a first load connected in circuit with said AC source;
c. a rechargeable battery connected in parallel with said load and said AC source;
d. charging means coupling said AC source and said battery to recharge said battery when power is being supplied from said AC source above a predetermined value to said load;
e. sensing means coupled to said AC source for generating a signal in response to power supplied by said AC source;
f. switching means connected in circuit with said load and said battery, said sensing means being coupled to said switching means, said switching means being operable to open and close said connection with said load and said battery when said power from said AC source is above and below, respectively, said predetermined value responsive to the signal being supplied to said switching means by said sensing means;
g. control means coupled to said switching means and said battery having conductive and non-conductive modes, said control means being conductive when said battery voltage is above a predetermined level and being non-conductive when said battery voltage falls below said predetermined level.

9. The system of claim 8 wherein said control means is a zener diode.

* * * * *

UNITED STATES PATENT OFFICE
CERTIFICATE OF CORRECTION

Patent No. 3,819,980            Dated June 25, 1974

Inventor(s) Ferdinand H. Mullersman

It is certified that error appears in the above-identified patent and that said Letters Patent are hereby corrected as shown below:

Assignee, indicated on introductory page, changed from "General Motors Company" to --General Electric Company--.

Column 8, line 57, Claim 2, changed "stable" to --astable--.

Column 10, line 27, Claim 5, after "below" inserted --respectively--.

Column 11, line 2, Claim 6, after "a" inserted --second--.

Signed and sealed this 5th day of November 1974.

(SEAL)
Attest:

McCOY M. GIBSON JR.            C. MARSHALL DANN
Attesting Officer             Commissioner of Patents